US006947923B2

United States Patent
Cha et al.

(10) Patent No.: US 6,947,923 B2
(45) Date of Patent: Sep. 20, 2005

(54) INFORMATION GENERATION AND RETRIEVAL METHOD BASED ON STANDARDIZED FORMAT OF SENTENCE STRUCTURE AND SEMANTIC STRUCTURE AND SYSTEM USING THE SAME

(75) Inventors: Keon-Hoe Cha, Taejon (KR); Eui-Sok Chung, Taejon (KR); Soo-Jung Lim, Seoul (KR); Hyun-Kyu Kang, Taejon (KR)

(73) Assignee: Electronics and Telecommunications Research Institute (KR)

( * ) Notice: Subject to any disclaimer, the term of this patent is extended or adjusted under 35 U.S.C. 154(b) by 577 days.

(21) Appl. No.: 09/852,317

(22) Filed: May 8, 2001

(65) Prior Publication Data

US 2002/0107844 A1 Aug. 8, 2002

(30) Foreign Application Priority Data

Dec. 8, 2000 (KR) .................................... 2000-74768

(51) Int. Cl.[7] .............................................. G06F 17/30
(52) U.S. Cl. ................................. 707/3; 707/2; 707/5
(58) Field of Search ..................... 707/2, 3–6; 704/9

(56) References Cited

U.S. PATENT DOCUMENTS

| | | | | |
|---|---|---|---|---|
| 5,471,611 A | * | 11/1995 | McGregor ...................... | 707/4 |
| 5,630,025 A | * | 5/1997 | Dolby et al. .................. | 706/46 |
| 5,715,468 A | * | 2/1998 | Budzinski ...................... | 704/9 |
| 5,768,578 A | * | 6/1998 | Kirk et al. ................... | 707/100 |
| 5,963,940 A | * | 10/1999 | Liddy et al. .................. | 707/5 |
| 6,076,088 A | * | 6/2000 | Paik et al. .................... | 707/5 |
| 6,081,774 A | * | 6/2000 | de Hita et al. ................ | 704/9 |
| 6,233,546 B1 | * | 5/2001 | Datig ........................... | 704/7 |
| 6,259,451 B1 | * | 7/2001 | Tesler ......................... | 345/419 |
| 6,356,864 B1 | * | 3/2002 | Foltz et al. .................... | 704/1 |
| 6,446,081 B1 | * | 9/2002 | Preston ..................... | 707/104.1 |
| 6,678,677 B2 | * | 1/2004 | Roux et al. ................... | 707/3 |

FOREIGN PATENT DOCUMENTS

KR          1999-47859          7/1999

OTHER PUBLICATIONS

Recovering from Parser Failures: A Hybrid Statistical and Symbolic Approach by Carolyn Penstein Rose et al. p 157–179 (no date).
"A Way of Constructing Knowledge Base by Analyzing Korean Text", G. Yang, et al., Cognitive Science, vol. 7, 4th issue, 1996, 12 pages.

* cited by examiner

Primary Examiner—Uyen Le
Assistant Examiner—Hanh Thai
(74) Attorney, Agent, or Firm—Blakely Sokoloff Taylor & Zafman

(57) ABSTRACT

The present invention relates to an information generation and retrieval apparatus based on a standardized format of sentence structure and semantic structure and a method thereof and a computer readable recording medium for recording a program for implementing the method. The method for generating and retrieving information for use in an apparatus for generating and retrieving information based on standardized formats of sentence structure and semantic structure, comprises a first step of transforming a natural language sentence (information and knowledge) described by a information provider to a conceptual graph depending on standardized formats of sentence structure and semantic structure and indexing the conceptual graph; and a second step of transforming a natural language query sentence inputted from a user to a conceptual graph depending on the standardized formats of sentence structure and semantic structure and searching information relevant to the requirement of the user among the indexed information.

12 Claims, 8 Drawing Sheets

FIG. 4A

| SENTENCE CATEGORY | TRANSFORMATION RULE |
| --- | --- |
| V-, C-, D-, n- | GENERATE SUBGRAPH INCLUDING ONLY RELATED NODE |
| N0, V0 | GENERATE SUBGRAPH INCLUDING ONLY CONCEPTUAL NODE |
| D0, A0 | GENERATE SUBGRAPH CONNECTING CONCEPTUAL NODE AND FORMULA-RELATED NODE |

FIG. 4B

| BEFORE PROCESSING CONCEPTUAL NODE | AFTER PROCESSING CONCEPTUAL NODE |
| --- | --- |
| [PARI/NUP] | [NATION:FRANCE]→(PART_OFF)→[CITY:PARIS] |

FIG. 5A

ATTR TABLE

| CONCEPT 1 | CONCEPT 2 | DOCUMENT ID |
|---|---|---|
| BANGBUB | Assertion030 | 1 |
| HYANGSU X | Assertion031 | 1 |
| SA/buy | INEXPENSIVE | 1 |

FIG. 5B

AGENT TABLE

| CONCEPT 1 | CONCEPT 2 | DOCUMENT ID |
|---|---|---|
| SA/buy | NULL | 1 |
| ⋮ | ⋮ | ⋮ |

FIG. 5C

EXPERIENCER TABLE

| CONCEPT 1 | CONCEPT 2 | DOCUMENT ID |
|---|---|---|
| JOEUN/good | HYANGSU X | 1 |
| ⋮ | ⋮ | ⋮ |

FIG. 5D

OBJECT TABLE

| CONCEPT 1 | CONCEPT 2 | DOCUMENT ID |
|-----------|-----------|-------------|
| SA/buy | HYANGSU X | 1 |
| ⋮ | ⋮ | ⋮ |

FIG. 5E

LOCATION TABLE

| CONCEPT 1 | CONCEPT 2 | DOCUMENT ID |
|-----------|-----------|-------------|
| SA/buy | PARI | 1 |
| ⋮ | ⋮ | ⋮ |

FIG. 5F

JUXTAPOSE TABLE

| CONCEPT 1 | CONCEPT 2 | DOCUMENT ID |
|-----------|-----------|-------------|
| HYANGSU X | MAN | 1 |
| ⋮ | ⋮ | ⋮ |

INFORMATION GENERATION AND RETRIEVAL METHOD BASED ON STANDARDIZED FORMAT OF SENTENCE STRUCTURE AND SEMANTIC STRUCTURE AND SYSTEM USING THE SAME

FIELD OF THE INVENTION

The present invention relates to an information generation and retrieval apparatus based on a standardized format of sentence structure and semantic structure and a method thereof and a computer readable recording medium for recording a program for implementing the method; and, more particularly, to an information generation and retrieval apparatus based on a standardized format of sentence structure and semantic structure for describing and retrieving information by generating natural language sentence that is relevant to a standardized format for sentence structure and semantic structure in order to generate, retrieve and transport information and knowledge fast and efficiently on the Internet and a method thereof and a computer readable recording medium for recording a program for implementing the method.

PRIOR ART OF THE INVENTION

One of most important factor is establishment of information services capable of storing, managing and transporting mass data in forwarding to information society. Digitalized data stored in databases and networks allowing remote online accessing evoke an essential technical issue of information management and information retrieval. Information retrieval is partitioned into two parts, information processing part in which information is accumulated and processed and information presentation part in which information is presented to an information requester and searched. And also, there is included a user interface technique for helping the information requester to use the information services more conveniently and efficiently.

Relating to information brokerage, multi-national PC communication companies like AOL(American On-Line) in U.S.A. provide a variety of information transport services and there is a trend of cooperating with Web information retrieval engine companies (e.g., Yahoo) to widening their commercial categories, however, there has no technique for brokering information commerce candidate adequately and fast and meditating commerce based on semantic representation of sentence and semantic likelihood.

Relating to semantic representation technique, information retrieval and natural language processing research centers like CIIR(Center for Intelligent Information Retrieval) in Massachusetts University in U.S.A. has developed an applied technique employing exquisite information extraction and information retrieval techniques based on word concept and semantic analysis of information from 1998, however, there has been no effort to apply them to information commerce. And also, Webpage markup language using OML(Ontology Markup Language), CKML (Conceptual Knowledge Markup Language) and so on is introduced in University of Maryland and. University of Southern California. Research for "Mikro-Kosmos" in New Mexico state University, "WordNet" in Princeton University, "CYC" of Cycorp, KIF(Knowledge Interchange Format) and Ontology for sharing reuse are progressed and each of institutes makes effort to suggest its scheme as a standard and, recently, IEEE(Institute of Electrical and Electronics Engineers) makes effort to establish a generalized and abstract upper level concept by standardized semantic hierarchical structure referred as SUO(standard Upper Ontology).

In Korea, PC communication companies such as Chollian, Naunuri, Hitel and so on relating to information transport determine commerce capability of an information providing commerce applicant and give information provider license to a selected applicant to allow it to collect and process information monopolisticly and register adequate menu and information PC communication community, and charge the bill for time for reading information to users. And also, Information Transaction Center set up in 1998 to handle information transaction through the Internet and already started brokering of Patent technique area. However, there is no protocol of information transaction and no concept of likelihood-based information extraction/matching technique for selecting proper transaction candidate automatically accurately is employed so that mass transaction of information Relating to semantic representation technique, Cheonbuk University and Pohang University of Science and Technology in Korea study basics for conceptual graph and ETRI, Ulsan University, Hannam University, Incheon University and Hoseo University study thesaurus systems. However, standardization of semantic representation and related techniques has not been established yet.

Accordingly, in the art of studying a standardized format for sentence structure and semantic structure, it is required a technique capable of describing and retrieving information by generating natural language sentence that is relevant to a standard for sentence structure and semantic structure in order to generate, retrieve and transport information and knowledge fast and efficiently on the Internet.

SUMMARY OF THE INVENTION

Therefore, it is an object of the present invention to provide an information generation and retrieval apparatus based on a standardized format for sentence structure and semantic structure of natural language sentences for user's describing and retrieving information, a method thereof and a computer readable recording medium for recording a program for implementing the method.

In accordance with an aspect of the present invention, there is provided an apparatus for generating and retrieving information based on standardized formats of sentence structure and semantic structure, the apparatus comprising;

a data storing unit for storing language knowledge data used to analyze a sentence for information supply and a query for information request from a user, semantic representation data for representing sense of sentence as a conceptual graph, and Web documents;

an input unit for receiving a natural language query sentence for generation of a natural language sentence for information supply and specification of information request from the user;

an input sentence analyzing unit for analyzing sentence structure of the natural language sentence or the natural language query sentence inputted from the user with reference to data stored at the data storing unit to generate semantic structure;

semantic structure processing unit for partitioning the semantic structure analyzed by the input sentence analyzing unit to index and store or for computing semantic relevance to search supply information and document most semantically relevant to the requested information specification;

an interactive processing unit for outputting sentence format rule for which failure data from the input sentence analyzing unit is corrected depending on the standardized formats of sentence structure and semantic structure, and indexing and searching result; and an information transferring unit for transferring the data from the interactive processing unit to the user.

In accordance with another aspect of the present invention, there is provided a method for generating and retrieving information for use in an apparatus for generating and retrieving information based on standardized formats of sentence structure and semantic structure, the method comprising the steps of:

(a) transforming a natural language sentence (information and knowledge) described by a information provider to a conceptual graph depending on standardized formats of sentence structure and semantic structure and indexing the conceptual graph; and (b) transforming a natural language query sentence inputted from a user to a conceptual graph depending on the standardized formats of sentence structure and semantic structure and searching information relevant to the requirement of the user among the indexed information.

In accordance with still another aspect of the present invention, there is provided an information generating method for use in an information generating apparatus based on standardized formats of sentence structure and semantic structure, the method comprising the steps of:

(a) generating a sentence in which ambiguities in sentence structure and semantic structure are solved depending on the standardized formats of sentence structure and semantic structure from a natural language sentence inputted by a information provider;

(b) transforming the generated sentence to a conceptual graph by sentence analysis and semantic analysis; and (c) transforming the transformed conceptual graph to a record of a table by a relation node and indexing the record.

In accordance with still another aspect of the present invention, there is provided an information retrieving method for use in an information retrieving apparatus based on standardized formats of sentence structure and semantic structure, the method comprising the steps of:

(a) analyzing sentence structure and semantic structure of a natural language query sentence received from a user to transform it to a conceptual graph;

(b) searching a conceptual graph in a database semantically nearest to the conceptual graph of the query and computing semantic relevance; and (c) retrieving indexed information by the searched conceptual graph and provide it to the user.

In accordance with still another aspect of the present invention, there is provided a computer readable medium for recording a program for implementing, at an information generating and retrieving apparatus based on standardized formats of sentence structure and semantic structure having a processor, the functions of:

(a) transforming a natural language sentence (information and knowledge) described by a information provider to a conceptual graph depending on standardized formats of sentence structure and semantic structure and indexing the conceptual graph; and (b) transforming a natural language query sentence inputted from a user to a conceptual graph depending on the standardized formats of sentence structure and semantic structure and searching information relevant to the requirement of the user among the indexed information.

In accordance with still another aspect of the present invention, there is provided a computer readable medium for recording a program for implementing, at an information generating apparatus based on standardized formats of sentence structure and semantic structure having a processor, the functions of:

(a) generating a sentence in which ambiguities in sentence structure and semantic structure are solved depending on the standardized formats of sentence structure and semantic structure from a natural language sentence inputted by a information provider;

(b) transforming the generated sentence to a conceptual graph by sentence analysis and semantic analysis; and (c) transforming the transformed conceptual graph to a record of a table by a relation node and indexing the record.

In accordance with still another aspect of the present invention, there is provided a computer readable medium for recording a program for implementing, at an information retrieving apparatus based on standardized formats of sentence structure and semantic structure having a processor, the functions of:

(a) analyzing sentence structure and semantic structure of a natural language query sentence received from a user to transform it to a conceptual graph;

(b) searching a conceptual graph in a database semantically nearest to the conceptual graph of the query and computing semantic relevance; and (c) retrieving indexed information by the searched conceptual graph and provide it to the user.

BRIEF DESCRIPTION OF THE DRAWINGS

The above and other objects and features of the instant invention will become apparent from the following description of preferred embodiments taken in conjunction with the accompanying drawings, in which:

FIGS. 4A and 4B are exemplary diagrams of sub-graph generated by sentence category and conversion rule and concept processing result depending on the sentence category in accordance with the present invention;

FIGS. 5A to 5F are exemplary diagram of table structure and record contents generated by division graph indexing result in accordance with the present invention.

PREFERRED EMBODIMENT OF THE INVENTION

The present invention comprises information supply procedure in which information and knowledge described by a user are transformed to- a concept graph to be stored and indexed by generating natural language sentences depending on standardized formats for sentence structure and semantic structure and information request in which information adequate to a user's requirement by analyzing user's query is retrieved and extracted.

During the information supply procedure, a sentence for which ambiguities of sentence structure and semantic structure is solved by a toolset for supporting information specification for facilitating generation of information and knowledge depending on standardized formats of sentence structures and semantic structure and then the generated sentence is transformed to a conceptual graph by analyzing the sentence structure and the semantic structure. And the conceptual graph is transformed to a record value in a table by relation node, to be stored and indexed.

During the information request procedure, user's natural language query is transformed to the conceptual graph by analyzing sentence structure and semantic structure and then a conceptual graph in a database, which is nearest to the conceptual graph of the query with respect to sense is searched and semantic appropriateness is computed to display information indexed by the searched conceptual graph to the user.

That is, in the present invention, information and knowledge can be retrieved and transacted efficiently and accurately by solving ambiguities in sentence structure and semantic structure by interacting with the user from the step of generating information and knowledge of the user for efficient information transaction by a standard format of sentence structure and semantic structure and by matching specification information of the user to the standardized format of the sentence structure and the semantic structure.

Hereinafter, preferred embodiments of the present invention will be described in detail with reference to the accompanying drawings.

Figure 1:
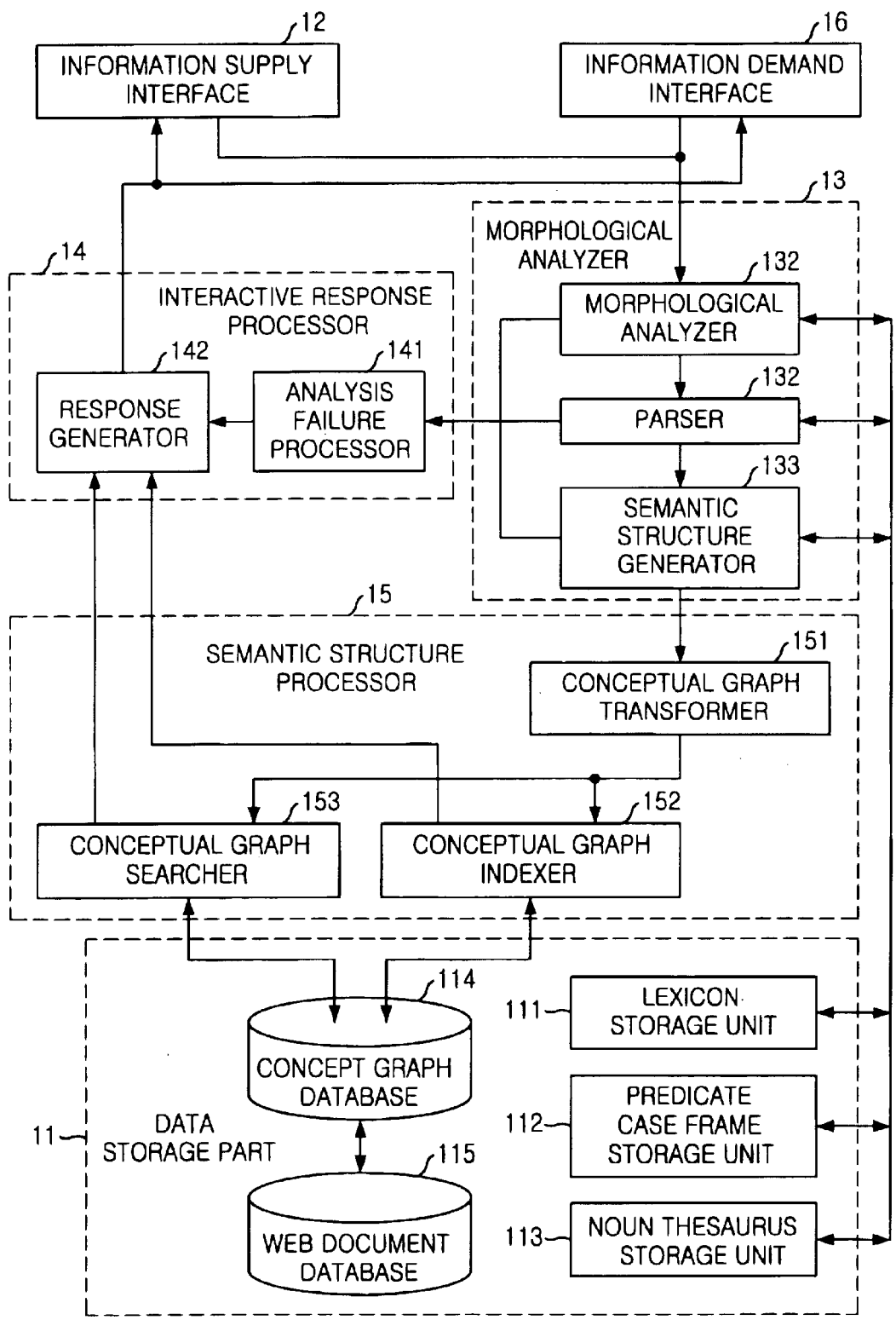
FIG. 1 is a block diagram of an information generation and retrieval apparatus based on a standardized format of sentence structure and semantic structure in accordance with the present invention.

FIG. 1 is a block diagram of an information generation and retrieval apparatus based on a standardized format of sentence structures and semantic structure in accordance with the present invention.

As shown in FIG. 1, the information generation and retrieval apparatus based on the standardized format of sentence structure and semantic structure of the present invention comprises a data storage part 11 for storing language knowledge data to be used for analyzing a sentence for supplying information from a user and a query for requesting information, semantic representation data for representing sense of the sentence by a conceptual graph, and Web documents, an information supply interface 12 for receiving natural language query for generating the sentence for supplying information to be transacted or specifying information request from the user, an input sentence analyzing part 13 for generating semantic structure by the inputted natural language sentence from the user with referring to the data at the data storage part 11, a interactive response processor 14 for solving spelling error or spacing error happened in the sentence generated by the user from the input sentence analyzing part 13, non-sentence disobeying the standardized formats for sentence structures and semantic structure and ambiguities in sentence structure and semantic structure to output the solved result and indexing and retrieving results, a semantic structure processor 15 receiving the semantic structure from the input sentence analyzing part 13 form indexing/storing or retrieving, and an information demand interface 16 for providing data from the interactive response processor 14 to the user.

Herein, the data storage part 11 includes a lexicon storage unit 111, a predicate case frame storage unit 112, a noun thesaurus storage unit 113, a concept graph database 114, and a Web document database 115. The input sentence analyzing part 13 includes a morphological analyzer 131, a parser 132 and a semantic structure generator 133. The interactive response processor 14 includes an analysis failure processor 141 and a response generator 142. The semantic structure processor 15 includes a conceptual graph transformer 151, a conceptual graph indexer 152 and a conceptual graph searcher 153.

It will described in detail for operation of the information generation and retrieval apparatus based on the standardized format of sentence structure and semantic structure of the present invention as described above.

Firstly, when the information supply interface 12 receiving information by the natural language sentence or the information demand interface 16 receiving specification for information required from the user transfers the inputted sentence to the input sentence analyzing part 13, the input sentence analyzing part 13 sequentially analyzes the inputted sentence by comparing it with data at the lexicon storage unit 111, the predicate case frame storage unit 112, and a noun thesaurus storage unit 113 of the data storage part 11. At that time, the morphological analyzer 131 does morphological analysis, the parser 132 parses the sentence to generate sentence structure tree, and the semantic structure generator 133 performs semantic analysis to generate the semantic structure, i.e., conceptual graph.

The conceptual graph transformer 151 discriminates the conceptual graph from the semantic structure generator 133 depending on semantic relation and the conceptual graph indexer 152 indexes Web documents including the supplied information from the user by using record of conceptual pair connected each discriminated relation. The conceptual graph searcher 153 searches the supplied information of highest semantic relevance by computing semantic relevance between semantic structure of the user's query and the stored semantic structure.

The analysis failure processor 141 receives failure type data produced for analysis failure happened by disobedience of the user against standard rule during analysis of the morphological analyzer 131, parser 132 and the semantic structure generator 133 and finds out corrected sentence format rule matched to the standard formats for sentence structure and semantic structure. The response generator 142 receives the corrected sentence format rule from the analysis failure processor 141, retrieval result from the conceptual graph searcher 152 or indexing result from the conceptual graph indexer 153 and produces response type and contents for the user.

The standardized formats for sentence structure and semantic structure can be expressed as follows.

(1) Standardized Format for Sentence Structure 201. noun paragraph
    NP1: (_NP+jc1)
    NP2: (_NP+jc2)
    NP3: (_NP+jc3)
202. Basic sentence
    S: (NP1 _VP)
    S: (NP1 NP2 _VP)
    S: (NP1 NP3 _VP)
    S: (NP1 NP2 NP3 _VP)
203. noun phase
    NP: (nclnn+ [nclnn] + [nclnn])
    NP: (nblnp)

-continued 204. embellishing word extended noun paragraph
    _NP: (mm! [dt] + [mm] ! . [nulad] NP! – [nn,nb])
205. noun paragraph extension of conjunctive auxiliary
    word, conjunctive adverb
    _NP: (NP+jj NP)
    _NP: (_NP maj _NP)
    _NP: (_NP!@+',' maj NP)
206. noun paragraph extension of the genitive case
    _NP: (_NP+jm _NP!^[NP])
207. descriptive word
    VP: (pv+ [ep] + [ef])
    VP: (pa+ [ep] + [ef])
    VP: (NP+co+ [ep] + [ef])
    VP: (NP+xsv+ [ep] + [ef])
208. descriptive word extension of adverb
    VP: (mag _VP!^[VP])
    VP: (maj _S)
209. descriptive word extension of auxiliary declinable
    word
    VP: (_VP: (_VP+ec px+ [ec]  [px] + [ep] + [ef])
210. noun paragraph extension of embellishing clause
    _NP: (ETMS: (_S+etm)   NP)
211. noun clause
    _NP: (_S+etn)
    _NP: (_S+etm  'gut')
212. descriptive word extension of quotation clause
    VP: (JQTS: (_S+'lago(go)  hago' _VP))
    VP: (JQTS: ('"'+_S+'"'+'lago(go)  hago'_VP))
213. descriptive word extension of adverb clause
    VP: (ADVS: (NP1   [NP2]   [NP3]  'ge|deutsi|dofok')  _VP)
    VP: (ADVS: (NP1   [NP2]   [NP3]  'gati|eobsi|dali')  _VP)
214. description clause
    VP: (NP1 _VP!^[VP])
215. conjunction
    S: (_S+ec _S)
(2)  Standardized format for semantic structure
<conceptual relation>
216. agent
    'yi/ga', 'eun/neun', '~ggeseo', '~eseo', '~yeu'
217. experiencer
    'yi/ga', 'eun/neun', '~yeu'
218. object
    'eul/reul', '~wa/gwa', 'eseo', '~yeu'
219. location
    '~eul', '~e', '~eseo', '~(eu)ro'
    219a. starting point
    219b. target point
220. C1 (TIME) C2
    '~e'
    220a. starting point
    220b. target point
221. purpose
    '~eul', 'ryumyun'
222. causal-effect
    '~(eu)ro'
223. receiver
    '~ege', '~e'
224. result
    '~(eu)ro'
225. instrument
    '~ro', '~e', '~a/eo(seo)'
226. comparison
    '~wa/gwa', '~mankeum', '~boda', 'churum'
    226a. comparison
    226b. equivalence
    226c. difference
    226d analogy
227. property
    '~yeu', '#'  [# is space]
    227a. owner
    227b. source
    227c. location
    228d. belonging to
    229e. substance
    229f. reciprocal
    229g. subsumption
    229h. whole-part
    29i. property of
    229j. juxtapose -continued <conceptual graph relation>
230. Juxtaposition
231. condition
232. causal-effect
233. context switch
    233a. unfinished precedence
    227b. finished precedence
234. involvement
235. possibility
236. concession Next, It will be described in detail for operation of each of the elements with referring to FIGS. 2a to 6.

Figure 2A:
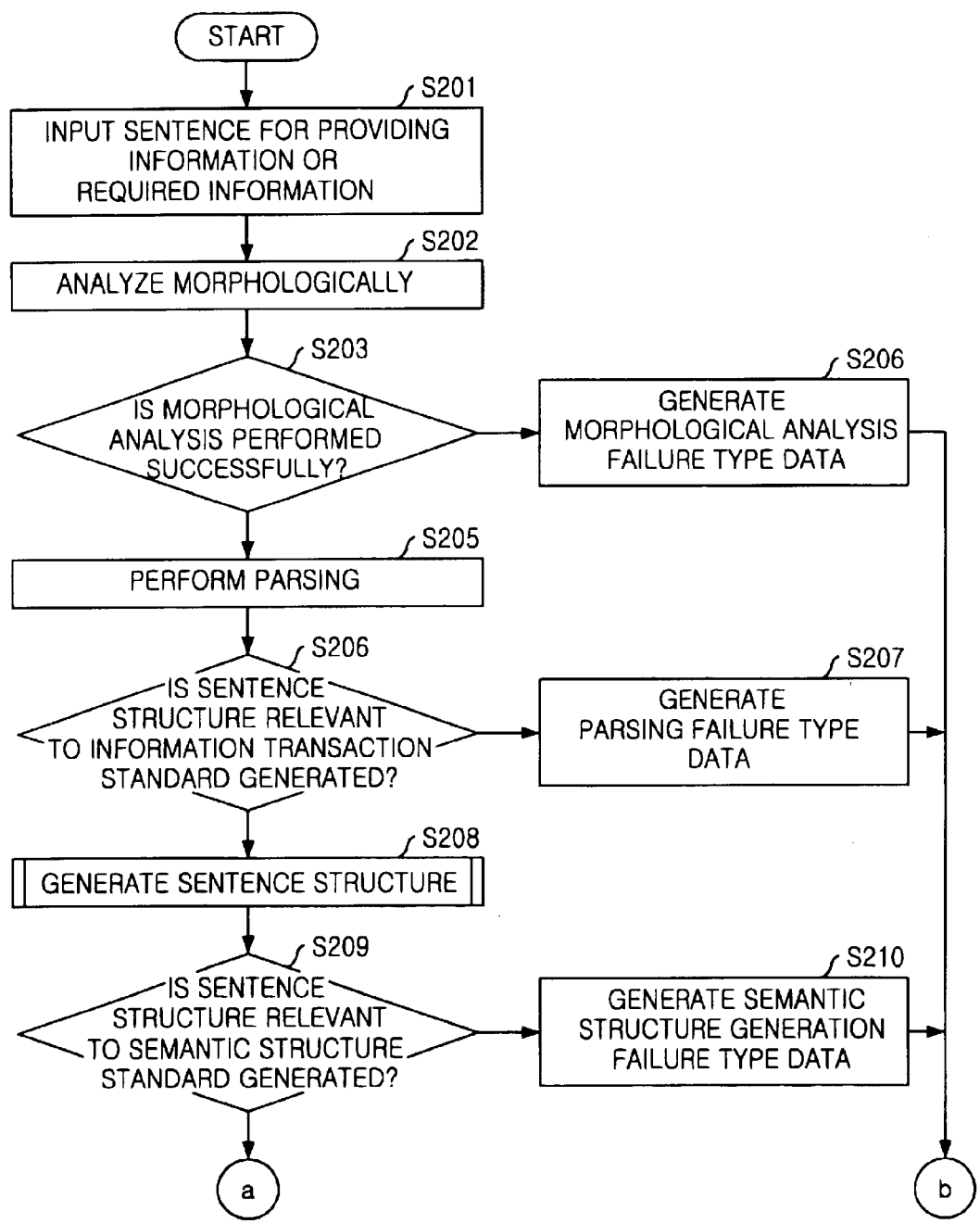
FIGS. 2A and 2B show flow charts for an embodiment of the information generation and retrieval method based on a standardized format of sentence structure and semantic structure in accordance with the present invention.
Figure 2B:
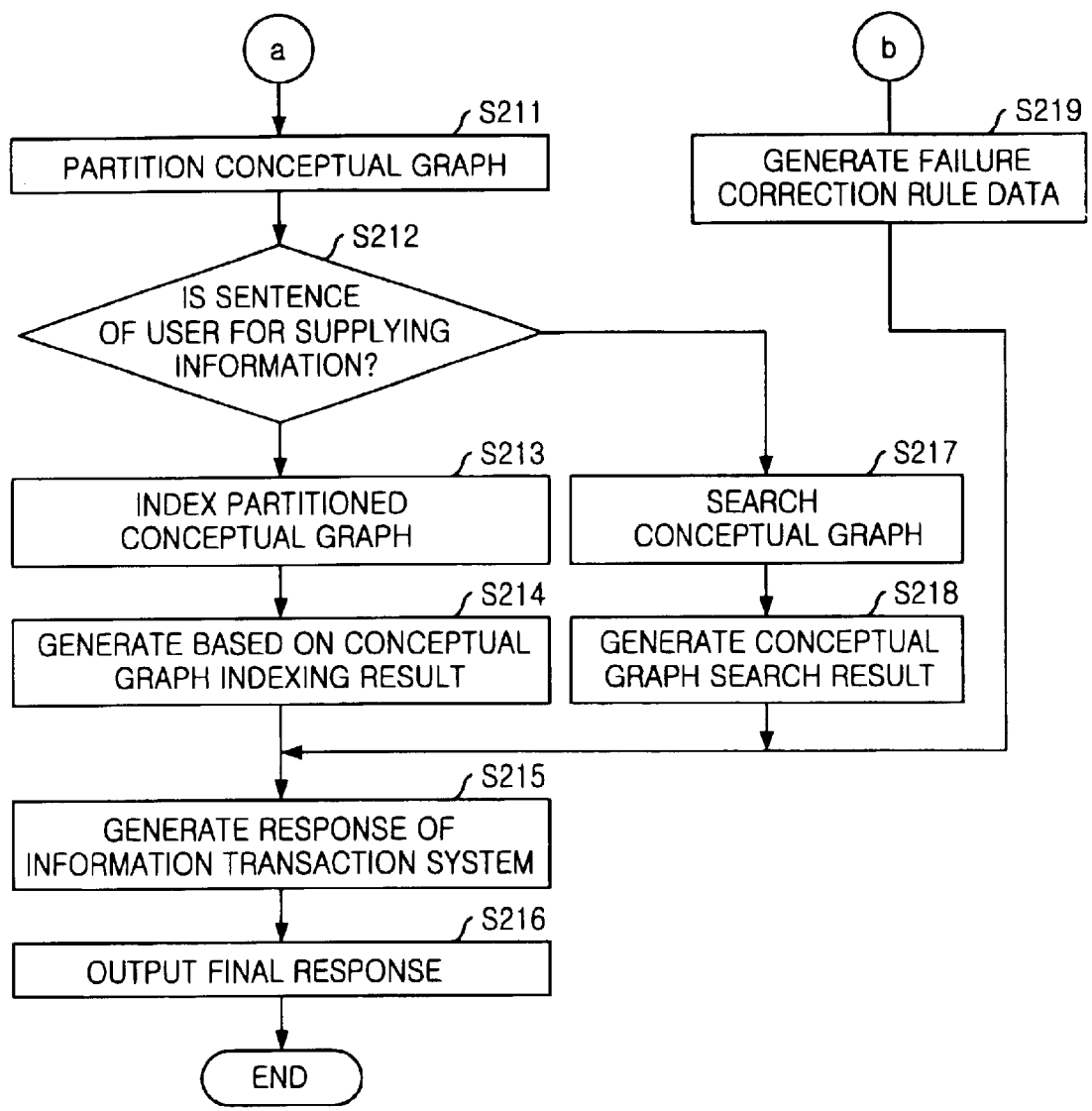

FIGS. 2A and 2B show flow charts for an embodiment of the information generation and retrieval method based on standardized formats of sentence structure and semantic structure of the present invention.

As shown in FIGS. 2A and 2B, in order to generate and retrieve information based on the standardized formats of sentence structure and semantic structure in accordance with the present invention, at step 201, the user inputs natural language sentence for providing information or required information through information supply interface 16. At step 202, the morphological analyzer 131 analyzes the inputted natural language sentence morphologically.

Subsequently, at step 203, it is checked whether morphological analysis is performed successfully and, at step 204, if morphological analysis fails, failure type data are generated depending on type of morphological analysis failure and, at step 205, if morphological analysis is performed successfully, parsing is performed by using the morphological analysis result.

Then, at step 206, it is checked whether sentence structure relevant to information transaction standard is generated and, at step 207, if generation of the sentence structure fails, parsing failure type data is generated and, at step 208, if the sentence structure is generated successfully, parse tree is transformed to generate the sentence structure.

Subsequently, at step 209, it is checked whether semantic structure relevant to the semantic structure standard is generated and, at step 210, if generation of the semantic structure fails, semantic structure generation failure type data are generated and, at step 211, if the semantic structure is generated successfully, the semantic structure is inputted to the conceptual graph transformer 151 to partition the conceptual graph.

And then, at step 212, it is checked whether the sentence inputted by the user is for information supply and, at step 213, if it is for information supply, each of the partitioned conceptual graph of the sentence is indexed for relation node. And, at step 214, data is generated depending on conceptual graph indexing result and, at step 215, response format and contents of an information transaction system are generated to output final response at step 216. On the other hand, at step 217, if the sentence inputted by the user is a query for information request, the conceptual graph nearest to the conceptual graph stored at the conceptual graph database 114 semantically is retrieved to generate conceptual graph retrieval result at step 218. And then, the procedure is progressed to the step 215 of generating the response format and contents of the information transaction system.

On the other hand, after generating the morphological analysis failure type data at step 204, generating the parse failure type data at step 207 and generating the semantic structure generation failure type data, the analysis failure processor 141 generates failure correction rule data at step 219 and then the procedure is progressed to the step 215 of generating the response format and contents of the information transaction system.

It will be described in detail for operation of an information generating and retrieving method based on the standardized formats of sentence structure and semantic structure of the present invention as described above.

The information generating and retrieving method based on the standardized formats of sentence structure and semantic structure comprises the steps of receiving a sentence through a text editor, morphologically analyzing the inputted sentence, presenting the analysis result to the user if morphological ambiguities or spelling error and receiving a corrected sentence from the user.

After receiving the morphological analysis result of the sentence and parsing, the analysis result is presented to the user if morphological ambiguities or spelling error and then the corrected sentence is received from the user or a number of sentence structures are provided to the user to let the user input a sentence matched to the standardized format of sentence structure.

And then, after receiving parsing result of the sentence and generating the semantic structure, if the semantic structure is not matched to the standardized format of the semantic structure or ambiguities of semantic structure happens, a number of semantic structures are provided to the user to let the user select one of them in order to match the sentence inputted by the user to the standardized format of semantic structure. And, partitioning and storing the semantic structure generated by semantic analysis result of the sentence with respect to the semantic relation node, if the user's information is for information supply, it is indexed by a record including the semantic relation node and its correlated conceptual node pair and identification of the document to be stored.

If the user's information is a specification for information request, semantic relevance between the semantic structure of the user's query and the semantic structure for supply information stored is computed so as to search semantically nearest supply information. And, receiving processing result from the analysis failure processor and the semantic structure processor, format and contents of result to be presented to the user are determined and response to be presented to the user is generated to output the response.

That is, the information generating and retrieving apparatus for information transaction of the present invention makes the sentence inputted by the user matched to (1) the standardized format of sentence structure (2) the standardized format of semantic structure and finally indexes to the conceptual graph for information supply procedure and analyzes the user's query and computes the semantic relevance by using the partitioned conceptual graph to search the nearest information semantically for information request procedure. The procedures are described for an exemplary sentence "a method for buying a good man perfume at Paris".

(A) sentence structure failure type data
(0,306,310)
  failure type 0: standard disobedience failure (failure type number,(standard disobedience identifier)+)
  failure type 1: sentence structure ambiguities (failure type number,(sentence structure)+)
(B) user presentation sentence structure type
(((joeun (namja (hyangsu))reul) (parieseo) (((sal) su) issneun) bangbub) (a method for buying a good man perfume at Paris)

(((joeun namja) hyangsu)reul) (parieseo) (((sal) su) issneun) bangbub) (a method for buying a good man perfume at Paris)(X)

As described above, for the sentence "joeun namja hyangsureul parieseo saneun bangbub (a method for buying a good man perfume at Paris)", morphological analysis result is generated without failure after the morphological analysis procedure.

However, undergoing the sentence analysis procedure, sentence structure failure type data as (A) is generated through the step 207 by the analysis failure processor 141 for the sentence by the restriction rule of the noun paragraph extension of the genitive case and the noun paragraph extension of the embellishing clause and the predicate case and frame information.

The (A) presents an example of failure type data of the sentence and typical data format of the failure type data. The failure type data is inputted to the response generator 142 and undergoes the step of response generating of the information transaction system and presents the result as the (B) to the user so that the user can select one among presented sentence structures to describe the sentence again.

The sentence structure tree of the input sentence that is selected by the user or is matched with the standardized sentence structure is transformed to the semantic structure by the semantic structure generator 133.

Figure 3:
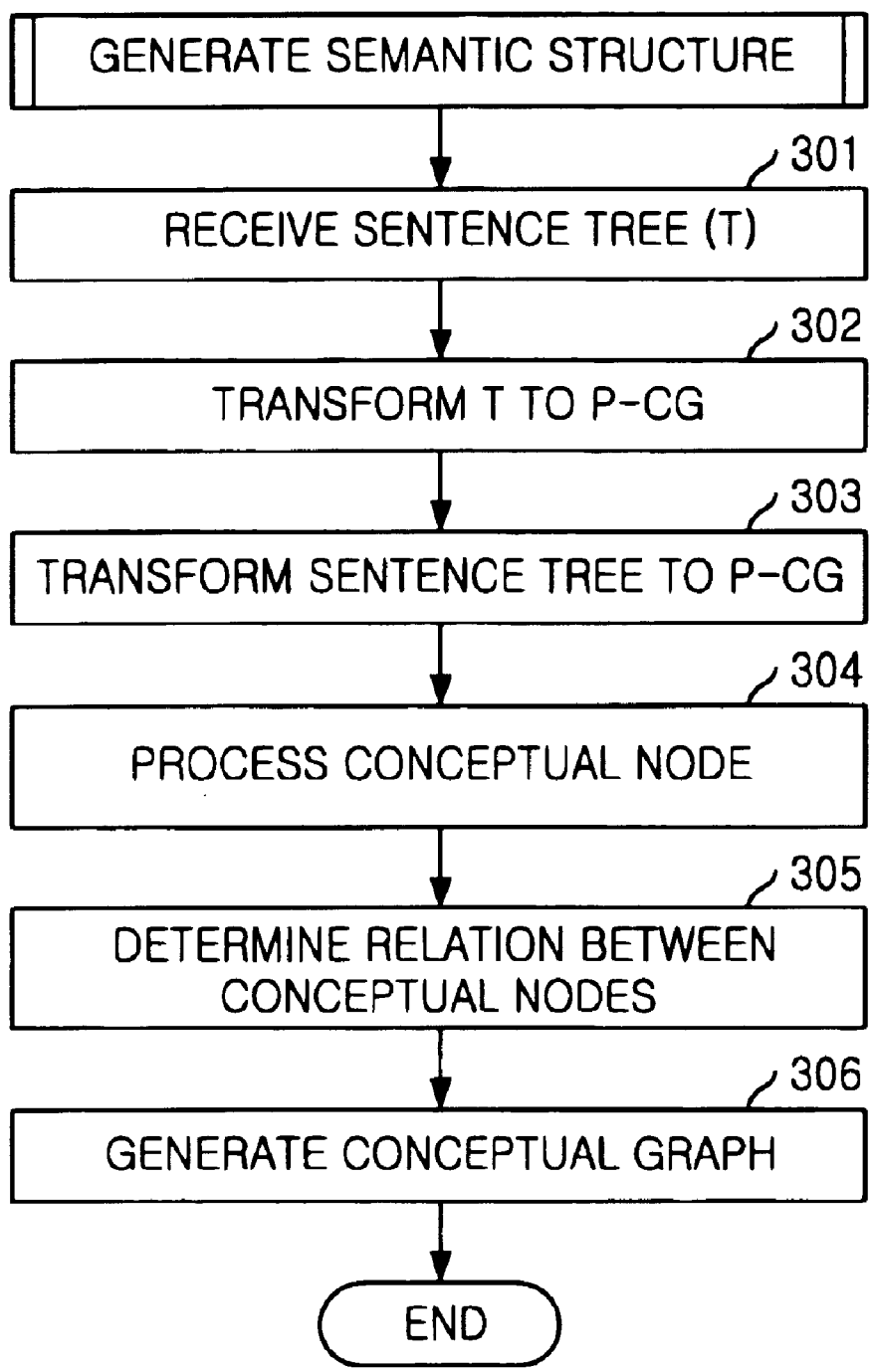
FIG. 3 is a detailed flow chart for the embodiment of the information generation and retrieval method as shown in FIGS. 2A and 2B.

FIG. 3 is a detailed flow chart for the step of semantic structure generating of the information generation and retrieval method as shown in FIGS. 2A and 2B.

As shown in FIG. 3, during the step of generating the semantic structure, a sentence tree (T) in which the sentence structure ambiguities are solved is inputted from the semantic structure generator 133 at step 301, and the sentence tree is transformed to a P-CG (pre-Conceptual Graph) in which the semantic ambiguities are not solved at step 302 by searching the nodes of the sentence tree in order of left-right-parent node and combining sub-graph generated from left-right-child nodes. A 0-level non-terminal having no left-right-child node is transformed to the sub-graph by using a tree transformation rule. The tree transformation rule is shown in FIG. 4A, which presents each sentence category used at the parser and its corresponding transformation rule.

For the P-CG 303 generated as described above, conceptual node processing step 303 and conceptual node relation determining step S304 are processed in order to transform it to the conceptual graph in which semantic ambiguities is solved.

Herein, at the conceptual node processing step 303, information to be processed as a referent is searched within the P-CG by using a definitive processing rule and designated as the referent, and information such as a proper noun and the tense is set as type information of the concept by using thesaurus information. The sub-graph generated after conceptual processing result for a conceptual node "pari" of the exemplary sentence "joeun namja hyangsureul parieseo saneun bangbub (a method for buying a good man perfume at Paris)" is shown in FIG. 4B. Subsequently, after the conceptual node processing, relation between the conceptual nodes is determined at the step S304 by the thesaurus and frame information. Relation between a predicate case that is a verb or an adjective and a conceptual node in subcategory of the predicate case is determined by the predicate frame and a case auxiliary word. And relation among nouns in a composite noun phrase is analyzed by using a rule and statistics.

When the semantic ambiguities happen during the procedure as described above, statistical word sense disambiguation is performed or a number of alternatives are presented to the user. For example, for "pari(Paris)" and "sa(buying)" in the exemplary sentence "joeun namja hyangsureul parieseo sal su issneun bangbub(a method for buying a good man perfume)" having semantic ambiguities of [city:Paris], [insect:fly] and [sa:live], [sa:buy]], respectively, the user is questioned to select one of them. After the procedure as described above, the conceptual graph of the final semantic structure is generated at the step S305.

---

(C) sentence structure tree : joeun namja hyangsureul parieseo sal su issneun bangbub
    (((joeun ((namja) hyangsu))reul) ((pari)eseo) (((((sa)l) su) iss)neun) bangbub)
(D) semantic structure conceptual graph : joeun namja hyangsureul parieseo sal su issneun bangbub
        [bangbub]->(ATTR)->[Assertion030]
        Assertion030: [sa]->(AGENT)->[NULL]
                         ->(OBJECT)->[perfume:X]
    ->(ATTR) [Assertion031]
        ->(JUXTPOSE) [man]
        ->(LOCATE)->[Paris]
        ->(ATTR)->[inexpensive]
        Assertion031: [joeun]->(EXPERIENCER)->[X]
(E) semantic structure failure type data
    (1, pari, Paris/city, fly/insect, sa, sa/live, sa/buy)
    semantic structure failure type 0 : standard semantic structure disobedience
        (0, (standard semantic structure disobedience item)+)
    semantic structure failure type 1: semantic ambiguities occurance
        (1, semantic ambiguities occurance node identifier, (semantic ambiguities occurance node identifier sense)++)
(F) Partition graph
    (ATTR)[bangbub][Assertion030]
    (AGENT)[sa][NULL]
    (OBJECT)[sa][perfume:X]
    (LOCATE)[sa][Paris]
    (ATTR)[sa][inexpensive]
    (ATTR)[X][Assertion03:]
    (JUXTAPOSE)[X][namja]
    (EXPERIENCE)[joeun][X]

---

The (C) and (D) present the sentence tree and the conceptual graph of the semantic structure for the sentence "joeun namja hyangsureul parieseo sal su issneun bangbub", which are inputs of the semantic structure generating step 208. For the sake of simplicity, the tense of the verb is omitted the semantic structure in the (D).

It is determined whether the final semantic structure generated as described above is relevant to the standardized format for semantic structure. By presenting the final conceptual graph to the user and confirming an intension of the user, relevance is determined. The (E) presents an exemplary of the semantic structure generation failure type data 210 and failure type data format in case that the final semantic structure is not relevant to the standardized format for semantic structure or the semantic ambiguities happen. The semantic structure confirmed by the user is relevant to the standardized format for semantic structure, the conceptual graph is partitioned depending on relation 211. The (F) presents an example of the partitioned graph for which the conceptual graph in the (D) is partitioned depending on the relation nodes.

After partitioning the conceptual graph, the conceptual graph is indexed when the input sentence from the user is for information supply and the conceptual graph is searched when the input sentence for the user is the query for information request. For the information supply, conceptual graph indexing is generation of the table of relational database including records, each having conceptual pair for the relation and Web document identifiers. The format and contents of the table generated by indexing the partitioned graph in the (F) is shown in FIGS. 5A to 5F. When the partitioned graph is for the query representing the user's request information, conceptual graph search is performed so as to retrieve the document semantically nearest to the user's request information represented by the query.

Figure 6:
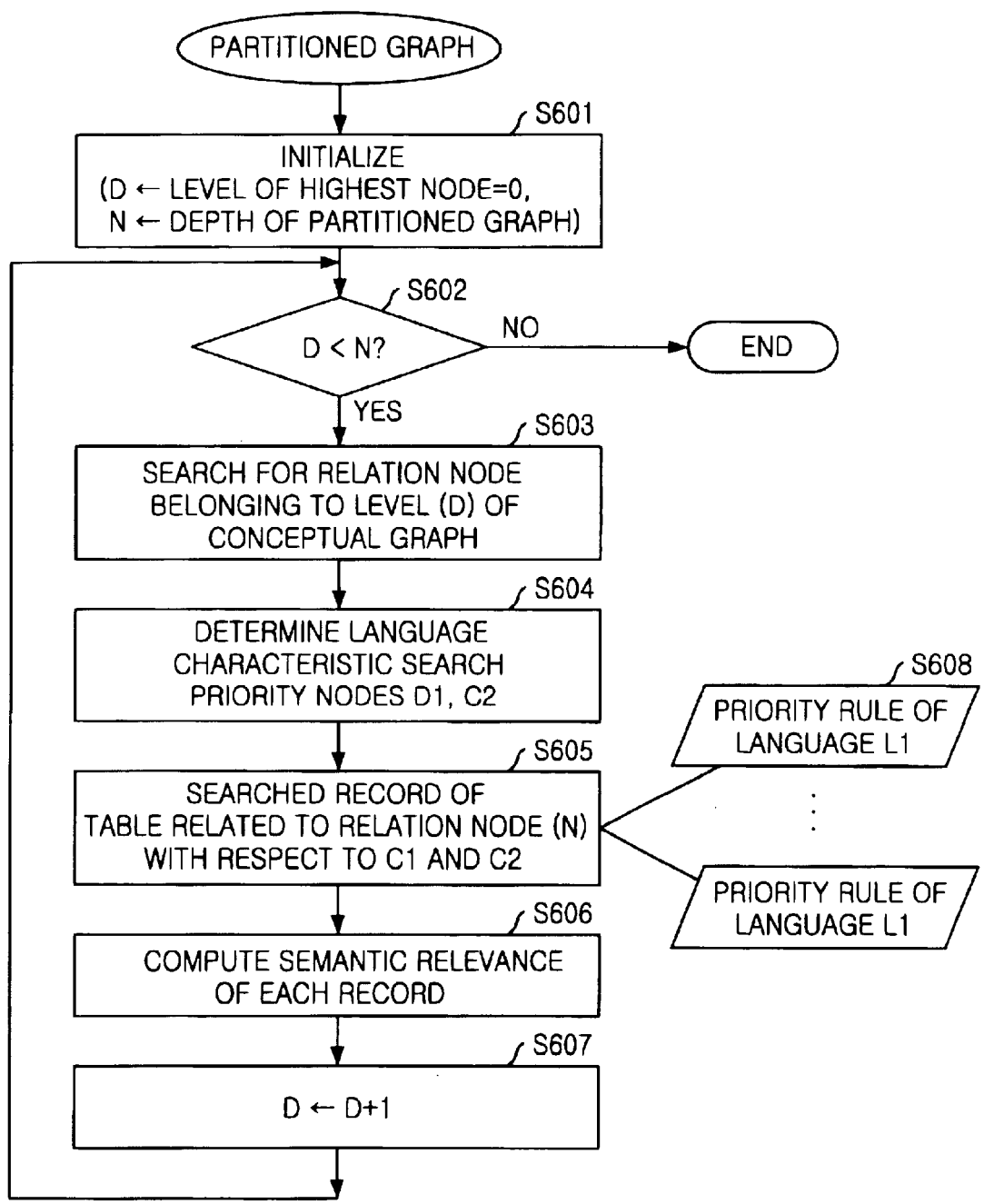
FIG. 6 is a flow chart for an embodiment of user request information and document retrieval procedure in accordance with the present invention.

FIG. 6 is a flow chart for an embodiment of user request information and document retrieval procedure in accordance with the present invention.

As shown in FIG. 6, after step 901 of initializing (d->the level of the highest node=0, N<-depth of the partitioned graph), the level of the highest node is compared with the depth of the partitioned graph at step 602 and, if it is less than the depth of the partitioned graph, search for the relation node that belongs to the level (d) of the conceptual graph at step 603.

Subsequently, language characteristic search priority nodes d1, c2 are determined at step 604, it is searched the record of the table related to the relation node (n) depending on the priority rule 608 of the language L1 with respect to the c1 and c2 at step 605, the semantic relevance of each record is computed at step 606, the level of the highest node is increased at step 607, and then the step 602 of comparing the level of the highest node with the depth of the partitioned graph is repeated.

That is, after the initializing step (d<-the level of the highest node=0, N<-the depth of the partitioned graph), if there are nodes to be searched at the step 602, it is searched the relation node that belongs to the current graph level. The graph level means location of hierarchical structure of the conceptual graph.

As the conceptual graph in the (D) and the partitioned graph in the (F), the "ATTR" table in FIG. 5A is the relation node of the highest level and the "AGENT" table in FIG. 5B is the relation node of the second highest level. The depth of the conceptual graph is total number of the relation nodes to its terminal node and the depth of the conceptual graph in the (D) is 4.

After determining the relation node to be searched, the language characteristic semantic relevance priority is determined for a pair of conceptual nodes connected to the relation node. When the relation is embellishing word + embellished word, the conceptual node corresponding embellished word has priority. In other cases in the language characteristic semantic relevance priority, the semantic priority is determined by a semantic priority rule uniquely existing for the language. After determining priority, the semantic relevance between each conceptual node and each record of the table for the relation node n is computed. The semantic relevance S(x,y) between concept x and concept y is computed as follows.

$$S(x, y) = \frac{1}{1 + d(x, y)} \qquad \text{Eq. (1)}$$

where d(x,y) is distance between the nodes in the thesaurus system.

d(x,y), i.e., the distance from the node x to the node y in the thesaurus system, is 0 if the y is one of lower nodes and is computed as the number of edges between the nodes if otherwise. For example, the valued of d('method', 'procedure') is 0 when 'procedure' is lower concept then 'method' in the conceptual network. Therefore, the semantic relevance S(I,Q) that a Web document (I) has for a particular query is computed as a sum of the semantic relevance for records indexed for I in the whole tale for the conceptual graph of all sentence that I has, which can be expressed as follows.

$$S(I, Q) = \sum_{l}^{L} \sum_{m}^{M} \sum_{n}^{N} \frac{1}{d} \{\delta \cdot s(C_1^l, r_1^{mn}) + (1-\delta) \cdot s(C_2^l, r_2^{mn})\}$$

After conceptual graph retrieval, the retrieved graphs are aligned in order the values of S(I,Q) and transferred to the response generator 142. The response generator 142 received indexing result, retrieved result or analysis failure type data and generates response sentence and result output format to output them to the user through the information supply interface 16 or information demand interface 12.

As described above, the method of the present invention is implemented as a program that can be stored at a computer readable recording medium, e.g., CD ROM, ROM, RAM, floppy disk, hard disk, optical magnetic disk and etc.

As described above, in the present invention, by describing information to be supplied or requested relevant to the standardized formats for sentence structure and semantic structure for information transaction using the natural language sentence such as English and Korean, efficient retrieval can be performed for tremendous information in the Internet and, by guiding to be relevant to the standardized formats of sentence structure and semantic structure from information generation and description stage, accurate and clear information in the Internet can be generated so that information transaction and transport can be encouraged.

And, in the present invention, by the sentence structure analysis with stratum, the semantic structure analysis in-depths and semantic relevance computation of the conceptual graph of the semantic structure for the sentence representing the query for information request or supplied information from the user, information of the sentence having different sentence structure but same semantic structure can be retrieved so that demand for transaction of information request or supplied information from the user can be satisfied.

While the present invention has been shown and described with respect to the particular embodiments, it will be apparent to those skilled in the art that many changes and modifications may be made without departing from the spirit and scope of the invention as defined in the appended claims.

What is claimed is:

1. An apparatus for generating and retrieving information based on standardized formats of sentence structure and semantic structure, the apparatus comprising:

a data storing means for storing language knowledge data used to analyze a sentence for information supply and a query for information request from a user, semantic representation data for representing sense of sentence as a conceptual graph, and Web documents;

an input means for receiving a natural language query sentence for generation of a natural language sentence for information supply and specification of information request from the user;

an input sentence analyzing means for analyzing sentence structure of the natural language sentence or the natural language query sentence inputted from the user with reference to data stored at the data storing means to generate semantic relation;

semantic structure processing means for partitioning the semantic structure analyzed by the input sentence analyzing means to index and store or for computing semantic relevance to search supply information and document most semantically relevant to the requested information specification;

an interactive processing means for outputting sentence format rule for which failure data from the input sentence analyzing means is corrected depending on the standardized formats of sentence structure and semantic structure, and indexing and searching result; and an information transferring means for transferring the data from the interactive processing means to the user, wherein the semantic relevance (S(x,y)) is a distance from a node x to another node y in the thesaurus system and can be express as:

$$S(x, y) = \frac{1}{1 + d(x, y)}$$

where d(x,y) is a distance between the nodes x and y in the thesaurus system, and d(x,y), i.e., the distance from the node x to the node y in the thesaurus system, is 0 if the node y is one of lower nodes and is computed as the number of edges between the nodes if otherwise.

2. The apparatus as recited in claim 1, wherein the input sentence analyzing means receives the sentence inputted from the user, sequentially analyzing it by comparing it with data of lexicon storing means, predicate case frame storing means and noun thesaurus storing means included in the data storing means, morphologically analyzes at a morphological analyzer, parses at a parser to generate a sentence structure tree, and performs semantic analysis at a semantic structure generator to generate the semantic relation.

3. The apparatus as recited in claim 1, wherein the semantic structure processing means includes:

a conceptual graph transformer for transforming a conceptual graph outputted from the semantic structure generator depending on semantic relation;

a conceptual graph indexer for indexing the Web documents including the supply information of the user by using a record of a conceptual pair related with the semantic relation transformed by the conceptual graph transformer; and a conceptual graph searcher for searching the supply information having highest semantic relevance between the semantic relation of the user's query and the stored semantic relation.

4. The apparatus as recited in claim 1, wherein the interactive processing means solves analysis failure of spelling or spacing error, non-sentence disobeying the standardized formats of sentence structure and semantic structure, and ambiguities of the sentence structure and the semantic structure.

5. A method for generating and retrieving information for use in an apparatus for generating and retrieving information based on standardized formats of sentence structure and semantic structure, the method comprising the steps of:

(a) transforming a natural language sentence (information and knowledge) described by an information provider to a conceptual graph depending on standardized formats of sentence structure and semantic structure and indexing the conceptual graph; and (b) transforming a natural language query sentence inputted from a user to a conceptual graph depending on the standardized formats of sentence structure and semantic structure and searching information relevant to the natural language query sentence inputted from the user among the indexed information, wherein the natural language sentence (information and knowledge) described by the information provider and the natural language query sentence inputted from the user to the conceptual graph depending on the standardized formats of sentence structure and semantic structure includes the steps of:

(f) morphologically analyzing the natural language sentence by a morphological analyzer when the natural language sentence for information to be provided by the information provider or to be supplied to the information provider and checking whether morphological analysis is performed successfully;

(g) if morphological analysis fails, generating failure type data depending failure type, and, if morphological analysis is performed successfully, analyzing the sentence structure by using the morphological analysis result;

(h) transforming the sentence analysis tree to the semantic relation depending on the generation of the analyzed sentence structure; and (i) inputting the semantic relation to a conceptual graph transformer depending on appropriateness of the semantic relation for the standardized format and partitioning the conceptual graph;

wherein the step (f) includes the steps of;

f1) initializing a highest node level (d) and depth (N) of the partitioned graph in order to retrieve request information and document of the information provider;

f2) after the initializing step, searching a relation node (n) that belongs to the level (d) of the conceptual graph depending on comparison result for the highest node level (d) and depth (N) of the partitioned graph;

f3) determining language characteristic search priority nodes (c1, c2) and computing semantic relevance (S(x, y)) of each record searched from a table related to the relation node (n) and depending on the priority rule of the language (L1-Ln) for the determined priority nodes (c1, c2); and f4) depending on computation of the semantic relevance (S(x,y)), increasing the level (d) of the highest node and repeating the step (j), wherein the semantic relevance (S(x,y)) is a distance from a node x to another node y in the thesaurus system and can be express as;

$$S(x, y) = \frac{1}{1 + d(x, y)}$$

where d(x,y) is a distance between the nodes x and y in the thesaurus system, and d(x,y), i.e., the distance from the node x to the node y in the thesaurus system, is 0 if the node y is one of lower nodes and is computed as the number of edges between the nodes if otherwise.

6. The method as recited in claim 5, wherein the step (a) includes the steps of:

(c) generating a sentence in which ambiguities of the sentence structure and the semantic structure of the sentence inputted by the information provider depending on the standardized formats of sentence structure and semantic structure;

(d) transforming the generated sentence to the conceptual graph by sentence analysis and semantic analysis depending on the standardized formats of sentence structure and semantic structure; and (e) transforming the conceptual graph to a record of a table by relation node and indexing the record depending on the standardized formats of sentence structure and semantic structure.

7. The method as recited in claim 5, wherein, at the step (a), a sentence relevant to the standardized formats of sentence structure and semantic structure is generated by generating information for information transaction to guide the user to make the sentence from the user have the standardized format.

8. The method as recited in claim 7, wherein, at the step (a), if the generation of the semantic structure fail, a number of analysis results is presented to the user in orders of analysis to help the user to select a correct sentence or sense.

9. The method as recited in claim 5, wherein the step (b) includes the steps of:

(c) analyzing the sentence structure and the semantic structure of the natural language query sentence received from the user and transforming the sentence to a conceptual graph;

(d) computing the semantic relevance by searching the semantically nearest conceptual graph at a database to the conceptual graph of the query; and (e) extracting information indexed by the searched conceptual graph to provide to the user.

10. The method as recited in claim 5, wherein the semantic structure generating step includes the steps of:

(j) receiving from a semantic structure generator a sentence tree (T) in which ambiguities of the sentence structure is solved and transforming the sentence tree (T) to pre-stage conceptual graph (P-CG) depending on a tree transformation rule;

(k) searching information to be processed as a referent from the P-CG by using a numeral and definitive processing rule to define as the referent and processing the conceptual node by setting a proper noun and the tense as type information of the concept by using a thesaurus system, in order to transform the transformed P-CG to a conceptual graph in which the semantic ambiguities are solved; and (l) after the concept node processing, generating a conceptual graph of a final semantic structure by determining relation between concept nodes by the thesaurus system and frame information.

11. The method as recited in claim 5, wherein, during the step (b), information stored and retrieved with respect to semantic relation by partitioning the semantic relation graph and information and document nearest to the request information specification of the user is retrieved by using the semantic relevance between concepts by using a noun thesaurus system.

12. A computer readable medium for recording a program for implementing, at an information generating and retrieving apparatus based on standardized formats of sentence structure and semantic structure having a processor, the functions of:

(a) transforming a natural language sentence (information and knowledge) described by a information provider to a conceptual graph depending on standardized formats of sentence structure and semantic structure and indexing the conceptual graph; and (b) transforming a natural language query sentence inputted from a user to a conceptual graph depending on the standardized formats of sentence structure and semantic structure and searching information relevant to the requirement of the user among the indexed information, wherein the natural language sentence (information and knowledge) described by the information provider and the natural language query sentence inputted from the user to the conceptual graph depending on the standardized formats of sentence structure and semantic structure includes the steps of:

(f) morphologically analyzing the natural language sentence by a morphological analyzer when the natural language sentence for information to be provided by the information provider or to be supplied to the information provider and checking whether morphological analysis is performed successfully;

(g) if morphological analysis fails, generating failure type data depending failure type, and, if morphological analysis is performed successfully, analyzing the sentence structure by using the morphological analysis result;

(h) transforming the sentence analysis tree to the semantic relation depending on the generation of the analyzed sentence structure; and (i) inputting the semantic relation to a conceptual graph transformer depending on appropriateness of the semantic relation for the standardized format and partitioning the conceptual graph, wherein the step (f) includes the steps of:

f1) initializing a highest node level (d) and depth (N) of the partitioned graph in order to retrieve request information and document of the information provider;

f2) after the initializing step, searching a relation node (n) that belongs to the level (d) of the conceptual graph depending on comparison result for the highest node level (d) and depth (N) of the partitioned graph;

f3) determining language characteristic search priority nodes (c1, c2) and computing semantic relevance (S(x, y)) of each record searched from a table related to the relation node (n) and depending on the priority rule of the language (L1-Ln) for the determined priority nodes (c1, c2); and f4) depending on computation of the semantic relevance (S(x,y)), increasing the level (d) of the highest node and repeating the step (j), wherein the semantic relevance (S(x,y)) is a distance from a node x to another node y in the thesaurus system and can be express as:

$$S(x, y) = \frac{1}{1 + d(x, y)}$$

where d(x,y) is a distance between the nodes x and y in the thesaurus system, and d(x,y), i.e., the distance from the node x to the node y in the thesaurus system, is 0 if the node y is one of lower nodes and is computed as the number of edges between the nodes if otherwise.

* * * * *